(12) United States Patent
Hattori (10) Patent No.: US 10,996,712 B2
(45) Date of Patent: May 4, 2021

(54) ELECTRONIC DEVICE (71) Applicant: Kyocera Corporation, Kyoto (JP)

(72) Inventor: Shigeto Hattori, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 79 days.

(21) Appl. No.: 15/031,820

(22) PCT Filed: Sep. 26, 2014

(86) PCT No.: PCT/JP2014/004943
§ 371 (c)(1),
(2) Date: Apr. 25, 2016

(87) PCT Pub. No.: WO2015/064008
PCT Pub. Date: May 7, 2015

(65) Prior Publication Data
US 2016/0246437 A1  Aug. 25, 2016

(30) Foreign Application Priority Data
Oct. 28, 2013  (JP) .............................. JP2013-223539

(51) Int. Cl.
G06F 1/16 (2006.01)
G06F 3/0487 (2013.01)
G06F 3/01 (2006.01)
G06F 3/0483 (2013.01)
G06F 3/041 (2006.01)

(52) U.S. Cl.
CPC .......... *G06F 1/1626* (2013.01); *G06F 1/1643* (2013.01); *G06F 1/1692* (2013.01); *G06F 3/016* (2013.01); *G06F 3/041* (2013.01); *G06F 3/0483* (2013.01); *G06F 3/0487* (2013.01);
(Continued)

(58) Field of Classification Search
CPC .... G06F 3/0416; G06F 1/1626; G06F 1/1643; G06F 1/1692; G06F 3/016; G06F 3/041; G06F 3/044; G06F 3/0483; G06F 3/0487; G06F 2203/04104; G06F 2203/04105
See application file for complete search history.

(56) References Cited

U.S. PATENT DOCUMENTS 7,966,573 B2 * 6/2011 Dodge .................. G06F 3/0481
715/815
8,712,478 B2 4/2014 Inami
(Continued)

FOREIGN PATENT DOCUMENTS

JP  2012-230567 A  11/2012
JP  2013-142907 A  7/2013
(Continued)

OTHER PUBLICATIONS

English Translation of JP 2013-200882, 2 parts.*
(Continued)

*Primary Examiner* — Patrick N Edouard
*Assistant Examiner* — Eboni N Giles
(74) *Attorney, Agent, or Firm* — Studebaker & Brackett PC (57) ABSTRACT

Operability is improved when operating an electronic device with one hand. An electronic device (1) includes a touch sensor on the front surface, a touch sensor on the back surface, and a controller (14) that closes a screen currently being displayed upon detecting an operation on the touch sensor (13) on the back surface.

4 Claims, 9 Drawing Sheets (52) U.S. Cl.
CPC .............. *G06F 2203/04104* (2013.01); *G06F 2203/04105* (2013.01)

(56) References Cited

U.S. PATENT DOCUMENTS

| | | |
|---|---|---|
| 9,158,378 B2 | 10/2015 | Hirukawa |
| 2012/0276958 A1 | 11/2012 | Inami |
| 2013/0007653 A1* | 1/2013 | Stolyarov ............ G06F 3/04845 715/784 |
| 2013/0042205 A1* | 2/2013 | Tsuda .................... G06F 3/0483 715/811 |
| 2013/0321317 A1 | 12/2013 | Hirukawa |
| 2016/0188181 A1* | 6/2016 | Smith ................... G06F 3/0414 715/765 |

FOREIGN PATENT DOCUMENTS

| | | |
|---|---|---|
| JP | 2013-200882 A | 10/2013 |
| NO | 2012/108203 A1 | 8/2012 |

OTHER PUBLICATIONS

English Translation of JP 2013-142907.*
International Search Report, PCT/JP2014/004943 dated Oct. 28, 2014.
Written Opinion of the International Searching Authority with Concise Explanation, PCT/JP2014/004943, dated Oct. 28, 2014.

* cited by examiner

ELECTRONIC DEVICE

CROSS-REFERENCE TO RELATED APPLICATION

This application claims priority to and the benefit of Japanese Patent Application No. 2013-223539 filed Oct. 28, 2013, the entire contents of which are incorporated herein by reference.

TECHNICAL FIELD

This disclosure relates to an electronic device that includes a touch sensor on the back surface thereof.

BACKGROUND

In recent years, more and more electronic devices, such as mobile phones, are provided with a touch sensor that can detect contact by a user. There are many known systems for detecting contact, such as a resistive film system and a capacitive system. All of these systems detect contact by a contacting object such as the user's finger or a stylus pen.

There are also electronic devices that, in addition to the front surface, also include a touch sensor on the back surface. For example, JP 2012-230567 A (PTL 1) discloses a mobile terminal that includes two touch sensors, one on the front surface and one on the back surface, and that based on a predetermined correspondence relationship associated with the usage state, accepts input to a first back surface or a second back surface as input to a first front surface or a second front surface, thereby increasing user-friendliness.

CITATION LIST

Patent Literature

PTL 1: JP 2012-230567 A

SUMMARY

Technical Problem

When operating an electronic device with one hand, it is necessary to operate objects such as icons and tabs displayed on the front surface with the thumb while holding the side and the back surface of the electronic device with the other four fingers and the palm of the hand. If the electronic device is large, however, objects displayed on the upper portion of the front surface cannot be reached with the thumb, making it difficult to operate the electronic device with one hand.

Therefore, it would be helpful to provide an electronic device with improved operability when operating the electronic device with one hand.

Solution to Problem

In order to resolve the above problem, an electronic device according to one of the embodiments includes a touch sensor on a front surface and a touch sensor on a back surface; and a controller configured to close a screen currently being displayed upon detecting an operation on the touch sensor on the back surface.

Furthermore, in the electronic device according to one of the embodiments, the controller may close the screen currently being displayed upon detecting an operation on the touch sensor on the back surface even when not detecting an operation on the touch sensor on the front surface.

An electronic device according to one of the embodiments includes a touch sensor on a front surface and a touch sensor on a back surface; a pressure detector configured to detect pressure on the touch sensor on the back surface; and a controller configured to close a screen currently being displayed upon data based on pressure detected by the pressure detector satisfying a predetermined standard.

Furthermore, in the electronic device according to one of the embodiments, the controller may close the screen currently being displayed upon data based on pressure detected by the pressure detector satisfying a predetermined standard even when not detecting an operation on the touch sensor on the front surface.

Advantageous Effect

According to this disclosure, operability can be improved when operating an electronic device with one hand.

DETAILED DESCRIPTION

The following describes embodiments in detail with reference to the drawings.

Embodiment 1

Figure 1:
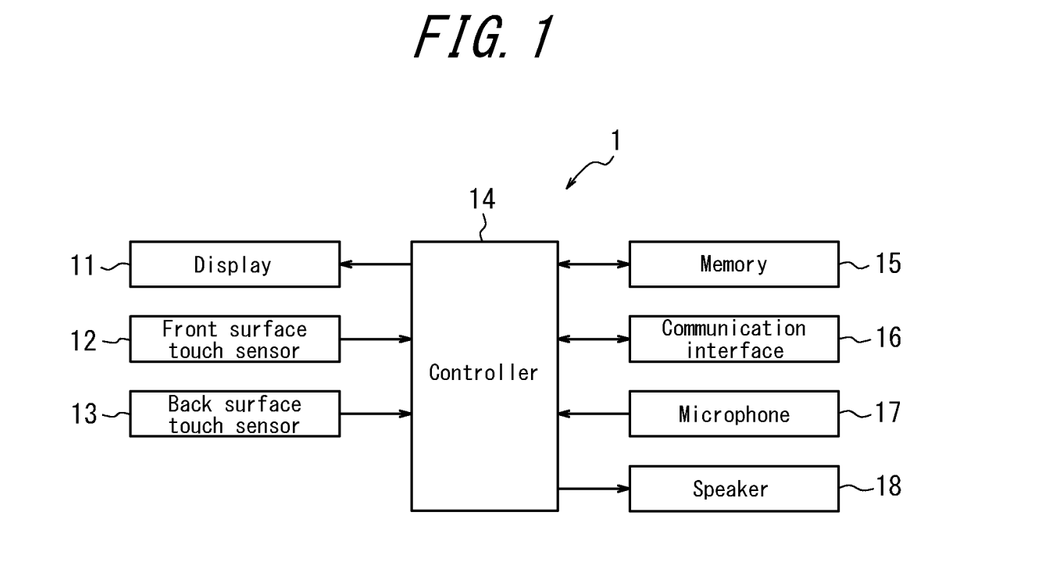
FIG. 1 is a block diagram schematically illustrating the structure of an electronic device according to Embodiment 1.

FIG. 1 is a block diagram schematically illustrating the structure of an electronic device according to Embodiment 1. In the example illustrated in FIG. 1, an electronic device 1 includes a display 11, a front surface touch sensor 12, a back surface touch sensor 13, a controller 14, a memory 15, a communication interface 16, a microphone 17, and a speaker 18.

The display 11 displays images of characters, photographs, objects for operation, and the like. The display 11 may be configured using a Liquid Crystal Display (LCD), an Organic Electroluminescence Display (OELD), or the like.

For example, on a home screen, the display 11 displays operation objects for performing operations for a telephone call, e-mail, Internet communication, taking a photograph, and the like.

The front surface touch sensor 12 detects contact or release of contact by a finger on an input face of the front surface touch sensor 12. The front surface touch sensor 12 detects the contact position on the input face and outputs a signal indicating the detected contact position to the controller 14. The front surface touch sensor 12 is configured with a transparent member and disposed in overlap on the front surface of the display 11. The user visually confirms images on the display 11 through the transparent front surface touch sensor 12 and causes the electronic device 1 to execute predetermined processing by operating the front surface touch sensor 12 at the display position of an object for operation displayed by the display 11. An operation on the touch sensor as referred to here includes all operations to contact the finger to the touch sensor, including touching, tapping, double tapping, flicking, and the like.

The back surface touch sensor 13 is disposed on the back surface of the electronic device 1 in order to improve operability when operating the electronic device 1 with one hand. The back surface touch sensor 13 detects contact or release of contact by a finger on an input face of the back surface touch sensor 13 and outputs the results of detection to the controller 14. The front surface touch sensor 12 and the back surface touch sensor 13 may, for example, be implemented with a known system such as a resistive film system or a capacitive system.

Upon detecting an operation on the front surface touch sensor 12 by a signal input from the front surface touch sensor 12, the controller 14 executes control corresponding to the object for operation displayed at the contact position.

Upon detecting an operation on the back surface touch sensor 13 by a signal input from the back surface touch sensor 13, the controller 14 executes predetermined processing on an image currently displayed on the display 11, even if an operation on the front surface touch sensor 12 is not detected. For example, upon detecting an operation on the back surface touch sensor 13, the controller 14 executes processing such as selecting an image or closing a currently displayed image.

The memory 15 may be configured with a semiconductor memory or the like. The memory 15 stores a variety of information, programs for causing the electronic device 1 to operate, and the like and also functions as a working memory.

The communication interface 16 allows wireless communication with a base station or other communication device.

The microphone 17 picks up surrounding sound, such as speech by the user. The sound picked up by the microphone 17 is converted to an electric signal and transmitted to the controller 14.

The speaker 18 output sounds such as voice, music, and a ringtone.

Figures 2A, 2B:
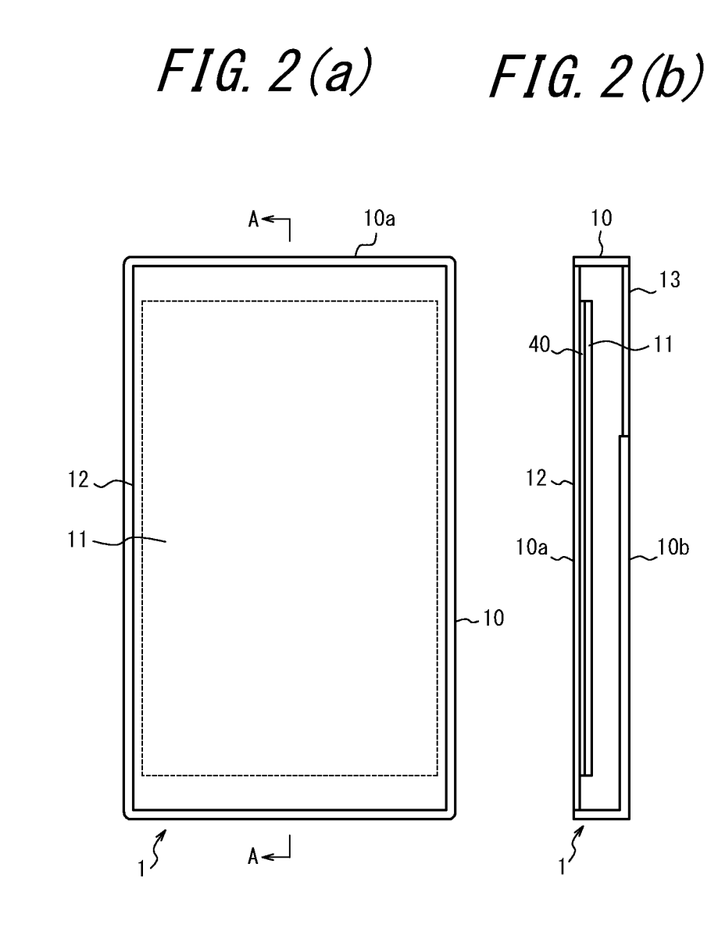
FIGS. 2(a), 2(b), and 2(c) illustrate an example of a housing structure of the electronic device according to Embodiment 1.
Figure 2C:
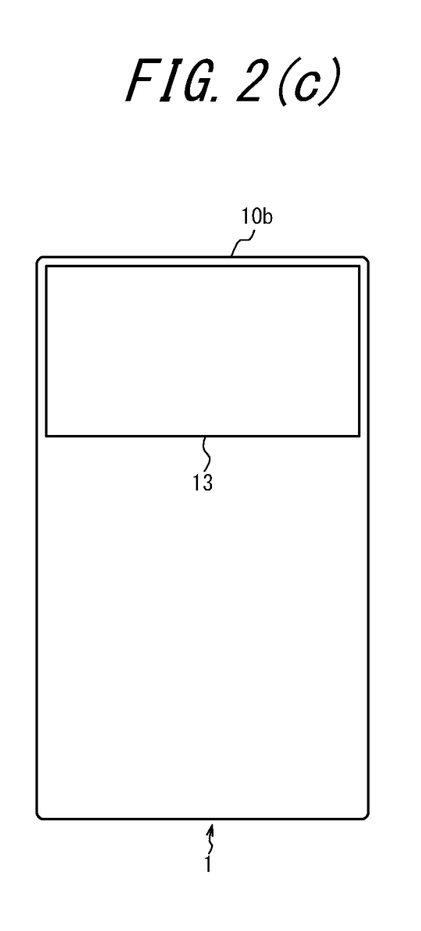

FIGS. 2(a), 2(b), and 2(c) illustrate an example of a housing structure of the electronic device 1 according to Embodiment 1. FIG. 2(a) is a front view, FIG. 2(b) is a cross-sectional view along the A-A line in FIG. 2(a), and FIG. 2(c) is a back view.

In FIGS. 2(a) to 2(c), illustration of constituent elements other than a housing 10, the display 11, the front surface touch sensor 12, the back surface touch sensor 13, and a joining member 40 is omitted. Apart from the constituent elements illustrated in FIGS. 2(a) to 2(c), the electronic device 1 may also for example include the controller 14, a substrate, and a variety of components. Typically, the microphone 17 is disposed at the bottom of the front surface touch sensor 12, and the speaker 18 is disposed at the top of the front surface touch sensor 12.

As illustrated in FIGS. 2(a) to 2(c), the front surface touch sensor 12 is disposed on a front surface 10a of the housing 10 (which for example is a metal resin case) and is supported by the housing 10.

The display 11 is disposed inside the housing 10. For example, the display 11 may be adhered to the back side of the front surface touch sensor 12 and directly secured to the inside of the housing 10 or secured to a substrate, a display holder, or the like disposed inside the housing 10. In FIGS. 2(a) to 2(c), the display 11 is adhered to the front surface touch sensor 12 with the joining member 40 therebetween. As illustrated in FIG. 2(b), by disposing the display 11 on the back side of the front surface touch sensor 12, then when the front surface touch sensor 12 and the display 11 constitute a touch panel, a user interface can freely be displayed on the display 11 and user operation can be detected by the front surface touch sensor 12. Note that the joining member 40 may be thermosetting or ultraviolet curable adhesive, double-sided tape, or the like. The joining member 40 may, for example, be optical elasticity resin, which is clear and colorless acrylic ultraviolet curing adhesive.

The back surface touch sensor 13 is disposed on a back surface 10b of the housing 10 so as to include a range that can be contacted by the index finger when the electronic device 1 is held in one hand, and the back surface touch sensor 13 is supported by the housing 10. For example, as illustrated in FIGS. 2(b) and 2(c), the back surface touch sensor 13 is disposed on the upper portion of the back surface 10b of the housing 10.

Figure 3A:
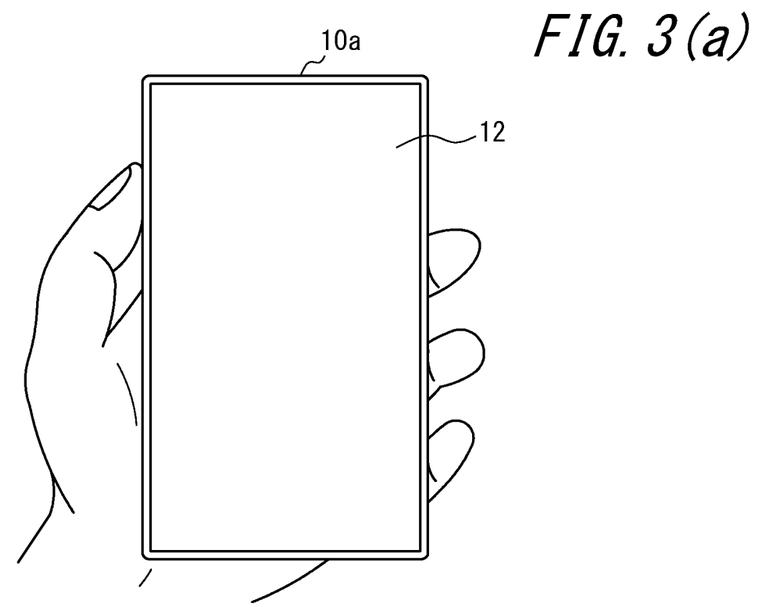
FIGS. 3(a) and 3(b) illustrate the user holding the electronic device in the left hand.
Figure 3B:
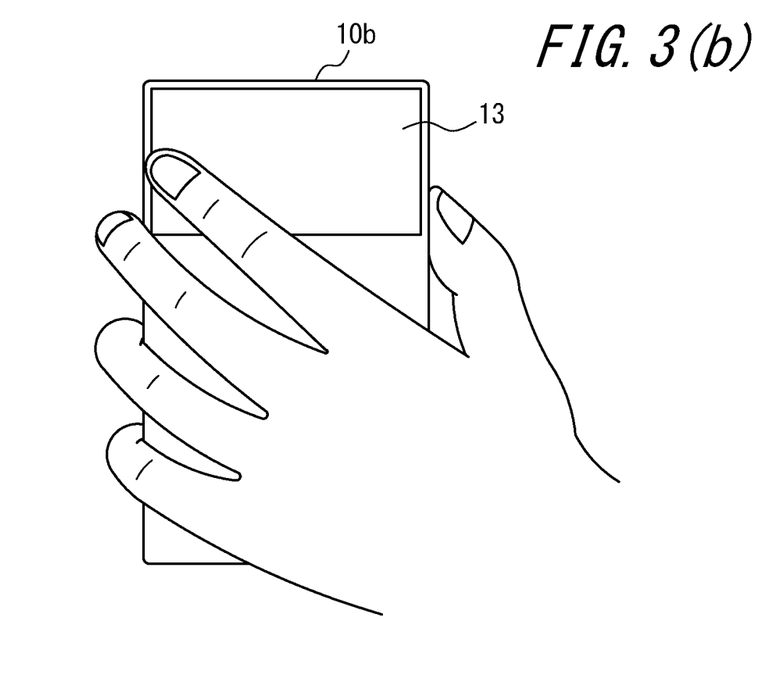

FIGS. 3(a) and 3(b) illustrate the user holding the electronic device 1 in the left hand. FIG. 3(a) is a view from the front surface, and FIG. 3(b) is a view from the back surface. As illustrated in FIG. 3(b), when the electronic device 1 is held in the left hand, the index finger is positioned on the back surface touch sensor 13. Accordingly, by simply bending the index finger, the user can operate (touch, tap, double tap, flick, or the like) the back surface touch sensor 13 easily without moving other fingers. In this embodiment, the back surface touch sensor 13 is limited to being disposed at a position that can be contacted by the index finger, but the back surface touch sensor 13 may be disposed over a wider area.

Figure 4:
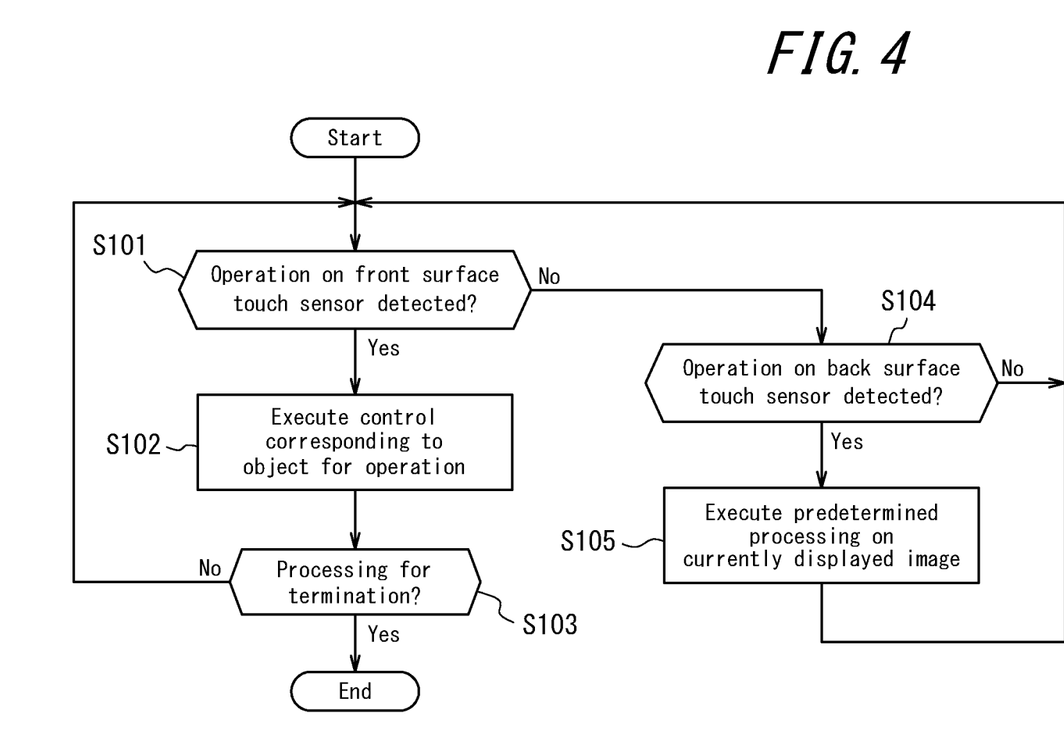
FIG. 4 is a flowchart illustrating processing by the electronic device according to Embodiment 1.

Next, processing by the electronic device 1 according to one of the embodiments of this disclosure is described. FIG. 4 is a flowchart illustrating processing by the electronic device 1 according to Embodiment 1.

Upon detecting a predetermined operation on the front surface touch sensor 12 by a signal input from the front surface touch sensor 12 (step S101: Yes), the controller 14 executes control corresponding to the object for operation displayed at the contact position (step S102). For example, when the display 11 is displaying a browser icon for opening an Internet connection, then upon detecting a tap with the front surface touch sensor 12 at the display position of the browser icon, the controller 14 opens an Internet connection with the communication interface 16, accesses a predetermined URL, and displays the acquired site screen on the display 11. When the processing in step S102 is processing to terminate the browser of the electronic device 1 (step S103: Yes), the controller 14 terminates processing and for example displays a home screen (standby screen) on the display 11.

Upon detecting a predetermined operation on the back surface touch sensor 13 by a signal input from the back surface touch sensor 13 (step S104: Yes), the controller 14 executes predetermined processing on an image currently displayed on the display 11, even if operation on the front surface touch sensor 12 is not detected (step S105). Specific examples of the predetermined processing in step S105 are described below.

Figure 5A:
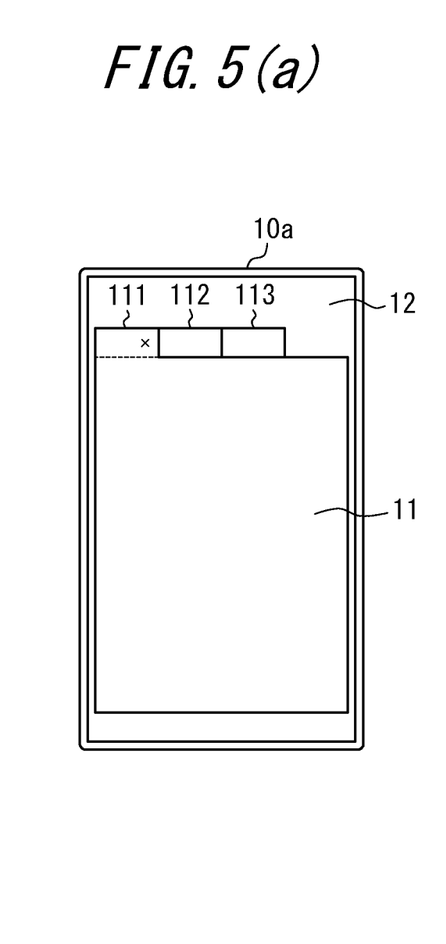
FIGS. 5(a), 5(b), and 5(c) illustrate processing executed by an operation on the back surface touch sensor of the electronic device according to Embodiment 1.
Figure 5B:
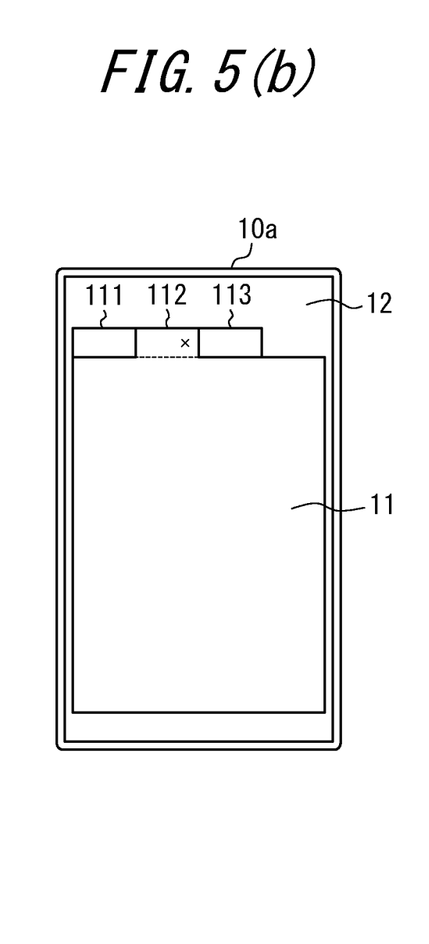
Figure 5C:
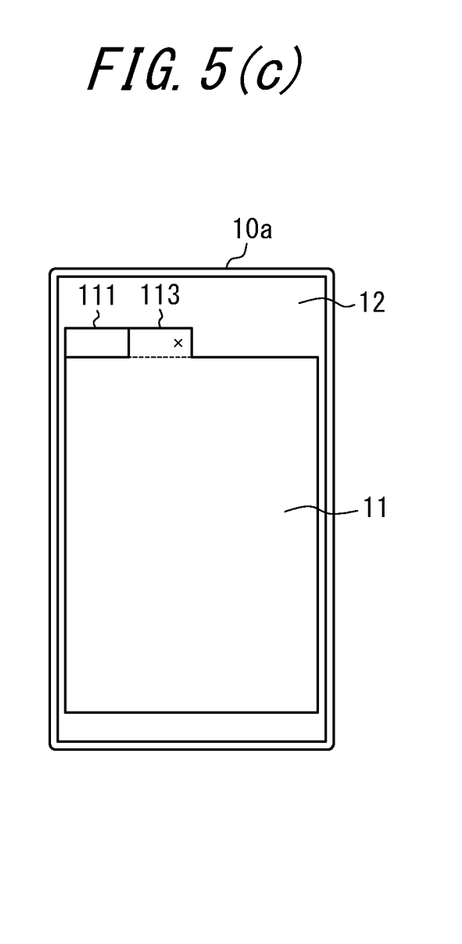

FIGS. 5(a) to 5(c) illustrate processing executed by an operation on the back surface touch sensor 13. In these figures, tab objects are used as icons that allow switching between display of a plurality of screens (images), but these icons are not limited to being tab objects.

The electronic device 1 can switch display between a plurality of screens (images) on the display 11. For example, after connecting to the Internet and displaying the screen for a certain site, when an action is performed such as accessing a linked page to display a new site screen, then the controller 14 can switch display on the display 11 between a plurality of screens. In the example in FIG. 5(a), three screens are displayed in pseudo-overlap, and tabs 111, 112, and 113 are displayed as icons that allow switching between display of a plurality of screens (images). The user can switch between the screens by tapping the display position of one of the tabs 111, 112, and 113 on the front surface touch sensor 12 to select one of the tabs. Upon detecting that the display position of the tab 112 on the front surface touch sensor 12 was tapped, the controller 14 displays the screen associated with the tab 112 on the display 11, as illustrated in FIG. 5(b).

In this way, by operating the front surface touch sensor 12, the user can select tabs to switch between a plurality of screens. Since the tabs are displayed on the upper portion of the display 11, however, the user's thumb might not reach the tabs when the user is operating the electronic device 1 with one hand. Therefore, in the electronic device 1 according to this disclosure, a tab can also be selected by operating the back surface touch sensor 13, allowing display of one of a plurality of screens supporting switchable display. For example, when the display 11 is displaying the image illustrated in FIG. 5(a), then by tapping the back surface touch sensor 13 with the index finger of the hand holding the electronic device 1, the user can select a tab by rotating between the tab 112, tab 113, tab 111, tab 112, . . . to switch between screens. In other words, upon detecting a first operation on the back surface touch sensor 13, the controller 14 selects and displays one of a plurality of screens supporting switchable display.

The user can also close a currently displayed screen by tapping an icon (for example, an x displayed at the right edge of the selected tab) for screen closing that closes the screen selected for display. For example, when the display 11 is displaying the image illustrated in FIG. 5(b), then by tapping the icon for screen closing of the tab 112, the user can close the currently displayed screen (the screen associated with tab 112), as illustrated in FIG. 5(c). In other words, upon detecting that the display position of the icon for screen closing of the tab 112 on the front surface touch sensor 12 was tapped, the controller 14 closes the currently displayed screen on the display 11 and displays the screens associated with the tabs 111 and 113 on the display 11 in pseudo-overlap.

In this way, by operating the front surface touch sensor 12, the user can close the screen currently displayed on the display 11. Since the icons for screen closing are displayed on the upper portion of the display 11, however, the user's thumb might not reach the icons when the user is operating the electronic device 1 with one hand. Therefore, in the electronic device 1 according to this disclosure, a screen can also be closed by operating the back surface touch sensor 13. For example, when the display 11 is displaying the screen in FIG. 5(b), then by double tapping the back surface touch sensor 13 with the index finger of the hand holding the electronic device 1, the user can close the currently displayed screen associated with the selected tab 112. In other words, upon detecting a second operation on the back surface touch sensor 13, the controller 14 closes the screen (image) currently displayed on the display 11.

As described above, in the electronic device 1 according to Embodiment 1, upon detecting an operation on the back surface touch sensor 13, the controller 14 performs processing on an image currently displayed on the display 11, such as selecting and displaying on the display 11 one of a plurality of screens (images) supporting switchable display or closing the screen currently displayed on the display 11. Therefore, according to the electronic device 1, operability can be improved when operating an electronic device with one hand.

Embodiment 2

Figure 6:
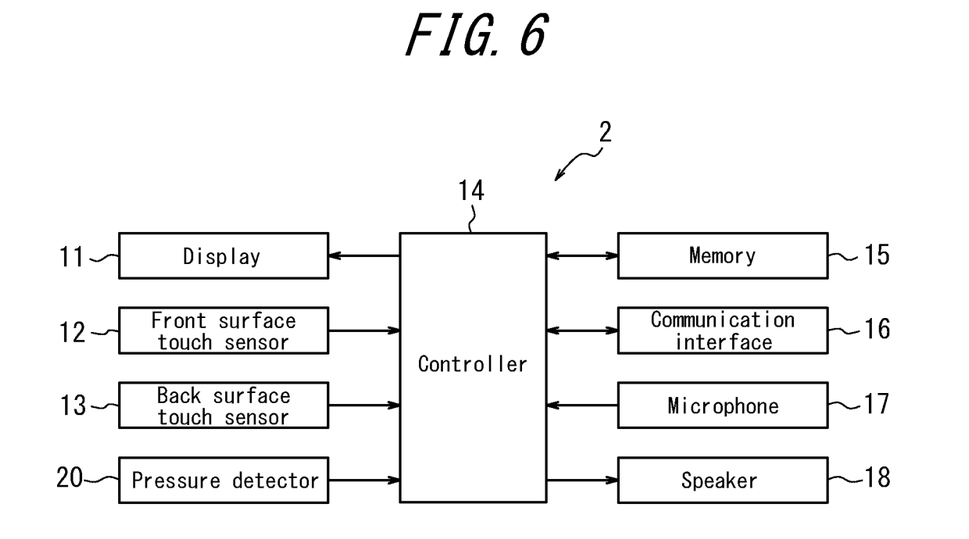
FIG. 6 is a block diagram schematically illustrating the structure of an electronic device according to Embodiment 2.

Next, Embodiment 2 is described. FIG. 6 is a block diagram schematically illustrating the structure of an electronic device according to Embodiment 2. As compared to the electronic device 1 according to Embodiment 1, an electronic device 2 according to Embodiment 2 further includes a pressure detector 20. The remaining structure is identical to that of Embodiment 1. Therefore, the same reference signs are applied, and a description thereof is omitted.

The pressure detector 20 detects pressure when the user performs an operation on the back surface touch sensor 13 and outputs data based on the pressure to the controller 14. The pressure detector 20 for example may be configured using a strain gauge sensor, a piezoelectric element, or the like that experiences a change in physical or electrical characteristics (strain, resistance, voltage, or the like) in response to pressure. When the pressure detector 20 is configured using a piezoelectric element, for example, the voltage value (data based on pressure), which is an electrical characteristic, of the piezoelectric element of the pressure detector 20 changes in accordance with the magnitude of the load (force) of the pressure on the back surface touch sensor 13 (or the speed at which the magnitude of the load changes (acceleration)). Note that instead of a voltage value, the data based on pressure may be the magnitude of the load, the power, the resistance, or the like due to pressure.

The pressure detector 20 may similarly detect pressure when the user performs an operation on the front surface touch sensor 12.

The controller 14 acquires the data based on pressure on the back surface touch sensor 13 (and the front surface touch sensor 12) from the pressure detector 20. When data based on pressure is at least a predetermined threshold, the controller 14 judges that a predetermined operation has been performed, and in response to the content of the operation, performs control to execute predetermined processing based, for example, on an application.

Furthermore, the pressure detector 20 can be configured in accordance with the contact detection system. For example, if the contact detection system is a resistive film system, the pressure detector 20 may be configured without using a strain gauge sensor, piezoelectric element, or the like by associating the magnitude of the resistance that corresponds to the size of the contact area with the load of the pressure on the touch face of the touch sensor. Alternatively, if the touch sensor uses a capacitive type system, a configuration without a strain gauge sensor, a piezoelectric element, or the like may be adopted by associating the magnitude of the capacitance with the load of the pressure on the touch sensor.

Figure 7A:
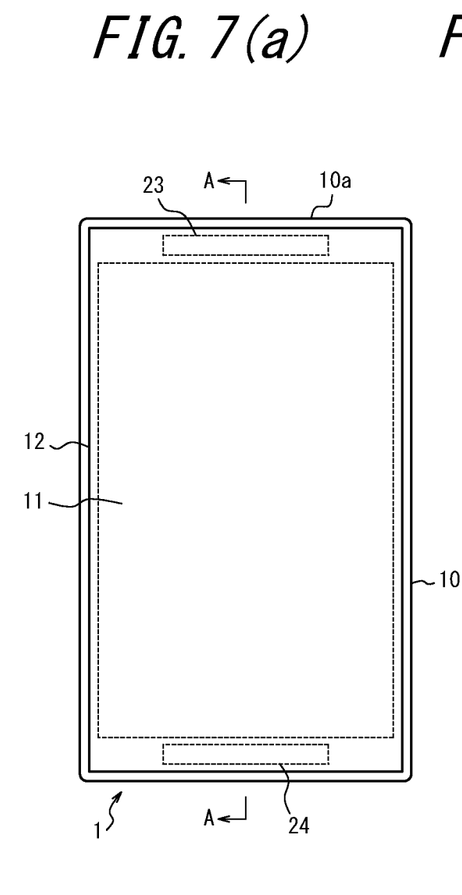
FIGS. 7(a), 7(b), and 7(c) illustrate an example of a housing structure of the electronic device according to Embodiment 2.
Figure 7B:
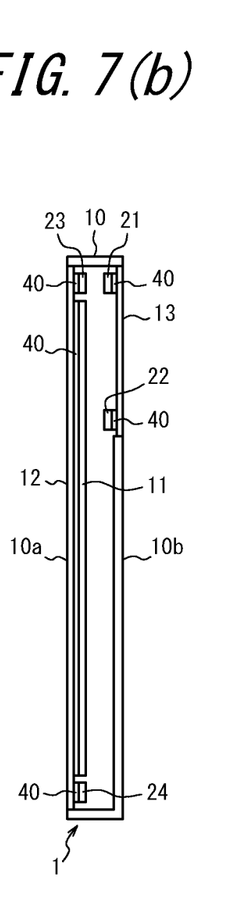
Figure 7C:
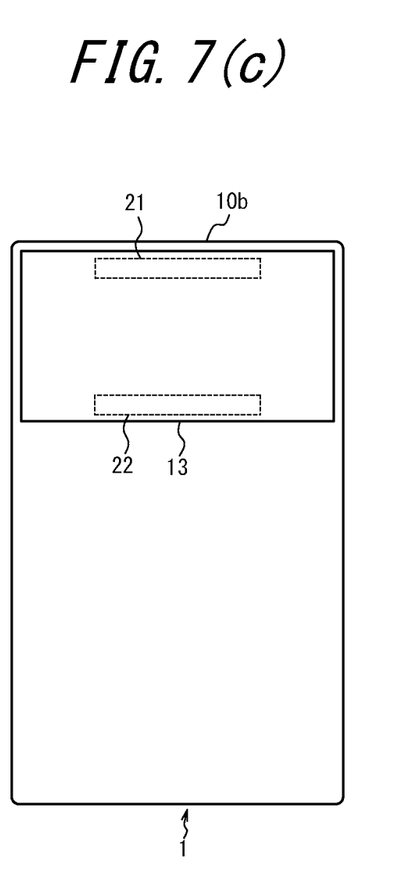

FIGS. 7(a), 7(b), and 7(c) illustrate an example of a housing structure of the electronic device 2 according to Embodiment 2. FIG. 7(a) is a front view, FIG. 7(b) is a cross-sectional view along the A-A line in FIG. 7(a), and FIG. 7(c) is a back view. FIGS. 7(a) to 7(c) illustrate the housing structure of the electronic device 1 in FIGS. 2(a) to 2(c) with the addition of piezoelectric elements 21 to 24 that form the pressure detector 20. The number and arrangement of the piezoelectric elements is not limited to the illustrated example.

In the example in FIG. 7, the pressure detector 20 includes a first piezoelectric element 21, a second piezoelectric element 22, a third piezoelectric element 23, and a fourth piezoelectric element 24, uses the first piezoelectric element 21 and the second piezoelectric element 22 to detect pressure when the user performs an operation on the back surface touch sensor 13, and uses the third piezoelectric element 23 and the fourth piezoelectric element 24 to detect pressure when the user performs an operation on the front surface touch sensor 12.

In FIG. 7(a), in the area on the front surface touch sensor 12 where the display by the display 11 does not need to be visible, i.e. the area where the front surface touch sensor 12 and the display 11 do not overlap, the area near the edges of the front surface touch sensor 12 is preferably painted or covered with a bezel. The third piezoelectric element 23, fourth piezoelectric elements 24, and the like can thus be prevented from being seen from the exterior of the electronic device 1.

Figure 8:
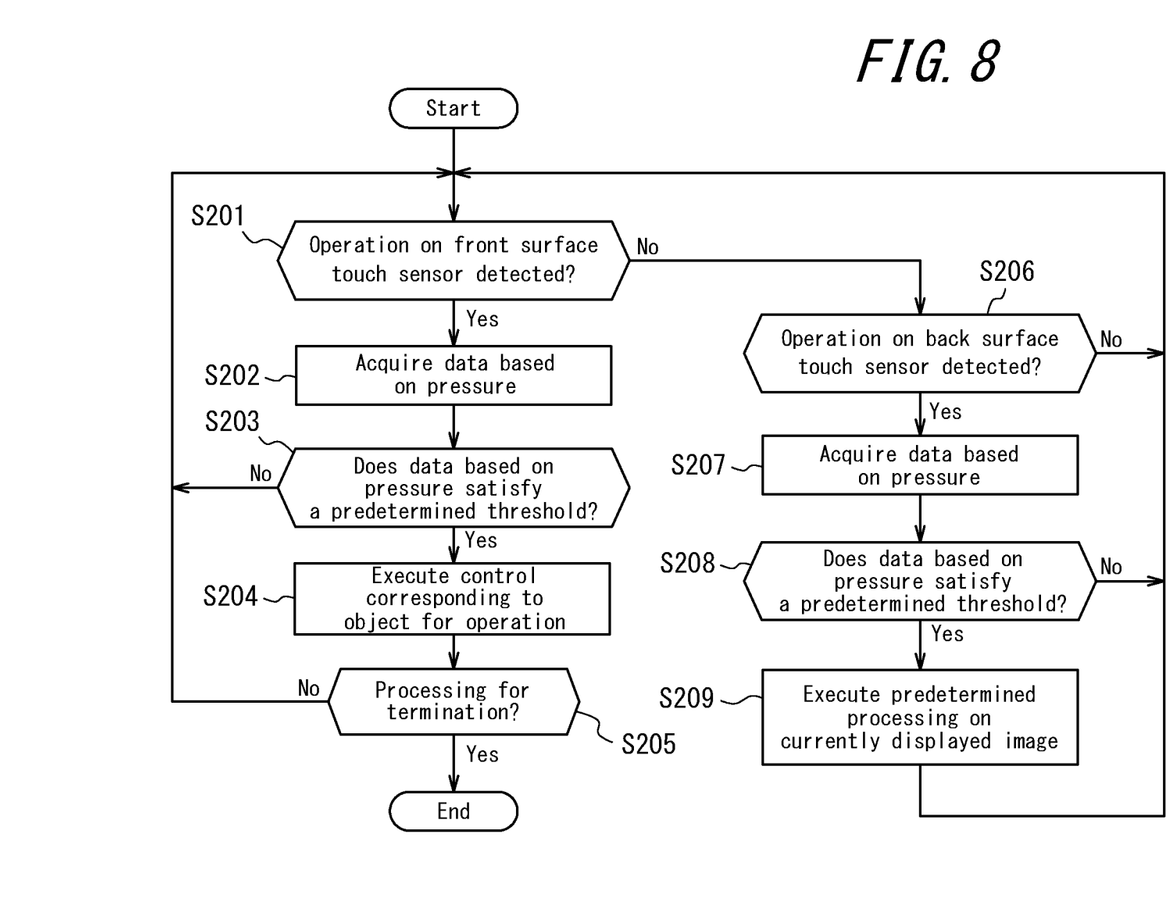
FIG. 8 is a flowchart illustrating processing by the electronic device according to Embodiment 2.

Next, processing by the electronic device 2 according to one of the embodiments of this disclosure is described. FIG. 8 is a flowchart illustrating processing by the electronic device 2 according to Embodiment 2.

Upon detecting a predetermined operation on the front surface touch sensor 12 by a signal input from the front surface touch sensor 12 (step S201: Yes), the controller 14 acquires data based on pressure on the front surface touch sensor 12 from the pressure detector 20 (step S202). The controller 14 then determines whether the acquired data based on pressure satisfies a predetermined threshold (step S203), and when the data based on pressure satisfies a predetermined threshold (step S203: Yes), the controller 14 judges that a pressure operation has been performed on the front surface touch sensor 12 and executes control in accordance with the object for operation displayed at the pressure position (step S204). Stating that the data based on pressure satisfies a predetermined threshold may refer to when data based on pressure has reached a predetermined standard value, to when data based on pressure has exceeded a predetermined standard value, or to when data based on pressure equivalent to a predetermined standard value has been detected. When the processing in step S204 is processing to close an application or a menu (step S205: Yes), the controller 14 terminates processing and for example displays a home screen (standby screen) on the display 11.

Upon detecting a predetermined operation on the back surface touch sensor 13 by a signal input from the back surface touch sensor 13 (step S206: Yes), the controller 14 acquires data based on pressure on the back surface touch sensor 13 from the pressure detector 20 (step S207). The controller 14 then determines whether the acquired data based on pressure satisfies a predetermined threshold (step S208), and when the data based on pressure satisfies at least a predetermined threshold (step S208: Yes), the controller 14 judges that an operation has been performed on the back surface touch sensor 13 and executes predetermined processing on a screen (image) or object currently displayed on the display 11, even if operation on the front surface touch sensor 12 is not detected (step S209). The predetermined processing is as described in Embodiment 1.

As described above, the electronic device 2 according to Embodiment 2 further includes a pressure detector 20, and when data based on pressure satisfies a predetermined threshold, the controller 14 executes predetermined processing on a screen (image) or object currently being displayed. Therefore, a judgement that the user has performed an operation can be prevented when the electronic device 2 has merely contacted another object lightly. In particular, when the user holds the electronic device, the fingers contact the back surface, but by having the pressure detector 20 detect pressure, an incorrect judgement that the user has performed an operation when in fact the user had no intention of doing so can be prevented.

Embodiment 3

Figure 9:
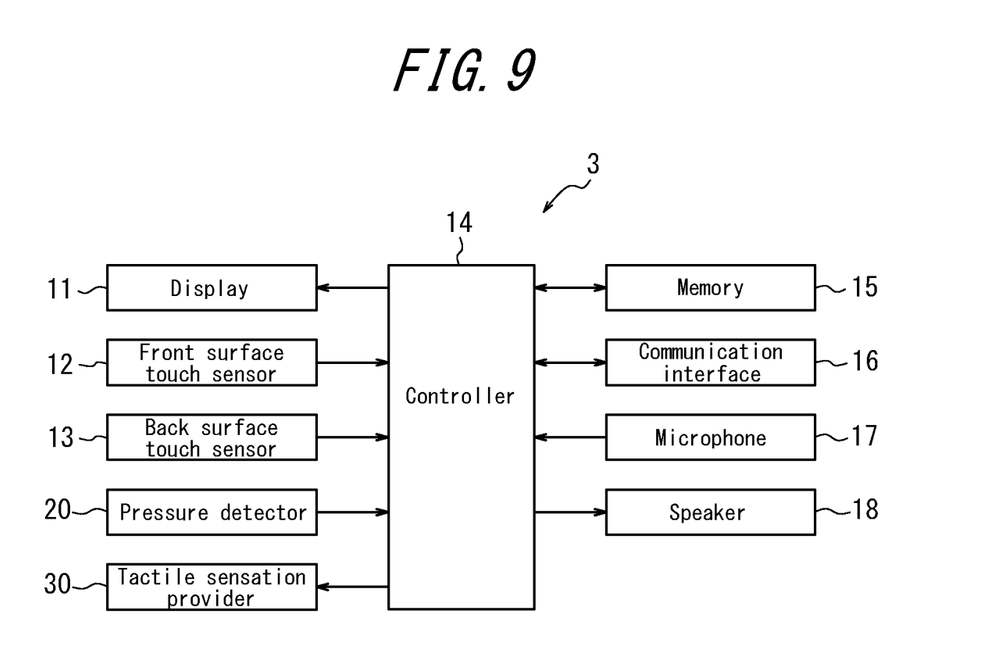
FIG. 9 is a block diagram schematically illustrating the structure of an electronic device according to Embodiment 3.

Next, Embodiment 3 is described. FIG. 9 is a block diagram schematically illustrating the structure of an electronic device according to Embodiment 3. As compared to the electronic device 2 according to Embodiment 2, an electronic device 3 according to Embodiment 3 further includes a tactile sensation provider 30. The remaining structure is identical to that of Embodiment 2. Therefore, the same reference signs are applied, and a description thereof is omitted.

The tactile sensation provider 30 generates a predetermined vibration based on a drive signal provided by the controller 14. It suffices for the drive signal to be a drive signal that expresses vibration, at the position contacted by the finger, corresponding to behavior of a real button that is to be expressed.

The tactile sensation provider 30 is configured using a piezoelectric element, an ultrasonic transducer, a vibration motor (eccentric motor), or the like, and by generating vibration with a predetermined vibration pattern, provides a tactile sensation to the user's finger pressing the back surface touch sensor 13, thereby providing the user with a sensory understanding that the back surface touch sensor 13 has been operated. Without using a mechanical vibration, the tactile sensation provider 30 may provide a tactile sensation to the user's finger pressing the back surface touch sensor 13 for example by controlling the electric charge of a film adhered onto the back surface touch sensor 13.

The tactile sensation provider 30 may also similarly generate vibration for the front surface touch sensor 12 to provide a tactile sensation to the user's finger pressing the front surface touch sensor 12.

The tactile sensation provider 30 may be configured integrally with the pressure detector 20. In particular, when the pressure detector 20 and the tactile sensation provider 30 are both configured using a piezoelectric element, they may be configured to share a common piezoelectric element. The reason is that a piezoelectric element generates voltage when pressure is applied and deforms upon application of voltage. An example of a housing structure for this case is as illustrated in FIGS. 7(a) to 7(c).

In the case of configuring the pressure detector 20 and the tactile sensation provider 30 with a piezoelectric element, when the voltage value of the piezoelectric element satisfies a predetermined threshold, the controller 14 may execute predetermined processing and generate vibration by driving the piezoelectric element. Stating that the voltage value of the piezoelectric element satisfies a predetermined threshold may refer to when the voltage value has reached a predetermined standard value, to when the voltage value has exceeded a predetermined standard value, or to when a voltage value equivalent to a predetermined standard value has been detected.

As described above, the electronic device 3 according to Embodiment 3 further includes the tactile sensation provider 30 and generates a predetermined vibration based on a drive signal provided by the controller 14. Therefore, when the user operates the back surface touch sensor 13 (and the front surface touch sensor 12), the electronic device 3 can provide the user with a sensory understanding that the intended operation has been performed.

The above embodiments have been described as representative examples, but it will be apparent to one of ordinary skill in the art that numerous modifications and replacements may be made within the spirit and scope of this disclosure. Therefore, this disclosure should not be interpreted as being restricted to the above-described embodiments. A variety of changes and modifications may be made without departing from the scope of the appended claims. For example, a plurality of the structural blocks described in the embodiments may be combined into one, or one structural block may be divided into multiple parts.

REFERENCE SIGNS LIST 1, 2, 3 Electronic device
11 Display
12 Front surface touch sensor
13 Back surface touch sensor
14 Controller
15 Memory
16 Communication interface
17 Microphone
18 Speaker
20 Pressure detector
21 First piezoelectric element
22 Second piezoelectric element
23 Third piezoelectric element
24 Fourth piezoelectric element
30 Tactile sensation provider
40 Joining member

The invention claimed is:

1. An electronic device comprising:
a touch sensor on a front surface and a touch sensor on an upper portion of a back surface; and
a controller to:
in response to detecting a first operation on the touch sensor on the back surface, select an object by rotating between objects currently displayed on the front surface and display a screen associated with the selected object, the screen being one of a plurality of screens supporting switchable display, wherein the controller is configured to perform the selection and the display upon detection of the first operation, irrespective of a contact position of the first operation; and
in response to detecting a second operation different from the first operation on the touch sensor on the back surface, close a screen associated with a selected object currently displayed on the front surface, wherein the controller is configured to close the screen upon detection of the second operation, irrespective of a contact position of the second operation.

2. The electronic device of claim 1, wherein the controller closes the screen associated with the selected object currently displayed on the front surface upon detecting the second operation on the touch sensor on the back surface, even when not detecting an operation on the touch sensor on the front surface.

3. An electronic device comprising:
a touch sensor on a front surface and a touch sensor on an upper portion of a back surface;
a pressure detector to detect pressure on the touch sensor on the back surface; and
a controller to:
in response to detecting a first pressure by the pressure detector on the touch sensor on the back surface and data based on the first pressure satisfying a first standard, select an object by rotating between objects currently displayed on the front surface and display a screen associated with the selected object, the screen being one of a plurality of screens supporting switchable display, wherein the controller is configured to perform the selection and the display upon detection of the first pressure and data based on the first pressure satisfying the first standard, irrespective of a contact position of the first pressure; and
in response to detecting a second pressure by the pressure detector on the touch sensor on the back surface and data based on the second pressure satisfying a second standard different from the first standard, close a screen associated with a selected object currently displayed on the front surface, wherein the controller is configured to close the screen upon detection of the second pressure and data based on the second pressure satisfying the second standard different from the first standard, irrespective of a contact position of the second pressure.

4. The electronic device of claim 3, wherein the controller closes the screen associated with the selected object currently displayed on the front surface upon detecting the second pressure on the touch sensor on the back surface and data based on the second pressure satisfying the second standard, even when not detecting an operation on the touch sensor on the front surface.

* * * * *